United States Patent [19]

Reudink

[11] Patent Number: 5,781,864
[45] Date of Patent: Jul. 14, 1998

[54] CELLULAR SYSTEM CONDITIONER WHICH OVERRIDES A DISCONNECT FOR ACTIVE RADIOS WIRELESSLY COMMUNICATING WITH MOBILES LOCATED IN PRE-IDENTIFIED TERRITORIAL POSITIONS

[75] Inventor: Douglas O. Reudink, Bellevue, Wash.

[73] Assignee: Metawave Communications Corporation, Redmond, Wash.

[21] Appl. No.: 651,980

[22] Filed: May 20, 1996

[51] Int. Cl.⁶ .............................. H04B 1/00; H04B 7/00; H04B 1/60; H04B 17/02
[52] U.S. Cl. .............................. 455/560; 455/421; 455/9
[58] Field of Search ........................ 455/560, 561, 455/562, 421, 9, 67.1, 67.3, 517, 516, 161.1, 161.2, 450, 453, 509, 439, 520

[56] References Cited

U.S. PATENT DOCUMENTS

| 4,121,158 | 10/1978 | Hanni et al. | 325/55 |
|---|---|---|---|
| 4,694,484 | 9/1987 | Atkinson et al. | 379/59 |
| 5,067,147 | 11/1991 | Lee | 379/60 |
| 5,193,109 | 3/1993 | Lee | 379/60 |
| 5,239,571 | 8/1993 | Takahashi | 379/58 |
| 5,426,690 | 6/1995 | Hikuma et al. | 379/62 |
| 5,504,936 | 4/1996 | Lee | 455/33.2 |
| 5,563,610 | 10/1996 | Reudink | 342/375 |
| 5,566,236 | 10/1996 | McLampy et Al. | 379/201 |
| 5,617,468 | 4/1997 | Nojima et al. | 379/58 |
| 5,648,968 | 7/1997 | Reudink | 370/335 |
| 5,722,068 | 2/1998 | Bartle et al. | 455/421 |

FOREIGN PATENT DOCUMENTS

| 0201254 | 11/1986 | European Pat. Off. | H04B 7/24 |
|---|---|---|---|
| 0639035 | 2/1995 | European Pat. Off. | H04Q 7/36 |
| 2690023 | 10/1993 | France | H04B 7/26 |

OTHER PUBLICATIONS

Nov. 1997, PCT/US97/07927—International Search Report—European Patent Office.

*Primary Examiner*—Tommy P. Chin
*Assistant Examiner*—David R. Vincent
*Attorney, Agent, or Firm*—Fulbright & Jaworski L.L.P.

[57] ABSTRACT

A system for monitoring and adapting radio signals at a cellsite to enable improved call management for mobiles active therein. Matrix switches, advantageously separate ones for the receive side and the transmit side of the cellsite's radios, have extra ports to which other devices are connected. These devices include signal modifiers such as amplifiers, filters, attenuators or interference cancelers, through which the radio signals may be routed within the switches to enable modification of the signals on a per-channel basis. These devices further include signal generators which may inject signals such as tones or noise to ports in the switches to create pretextual radio conditions that may trigger desired call management results. An air interface controller, advantageously in combination with a cell neighborhood host controller, governs operation of the system. The controller includes a message player whose prerecorded messages may be patched through to a land line party to notify that the mobile party has entered a blackout zone.

48 Claims, 1 Drawing Sheet

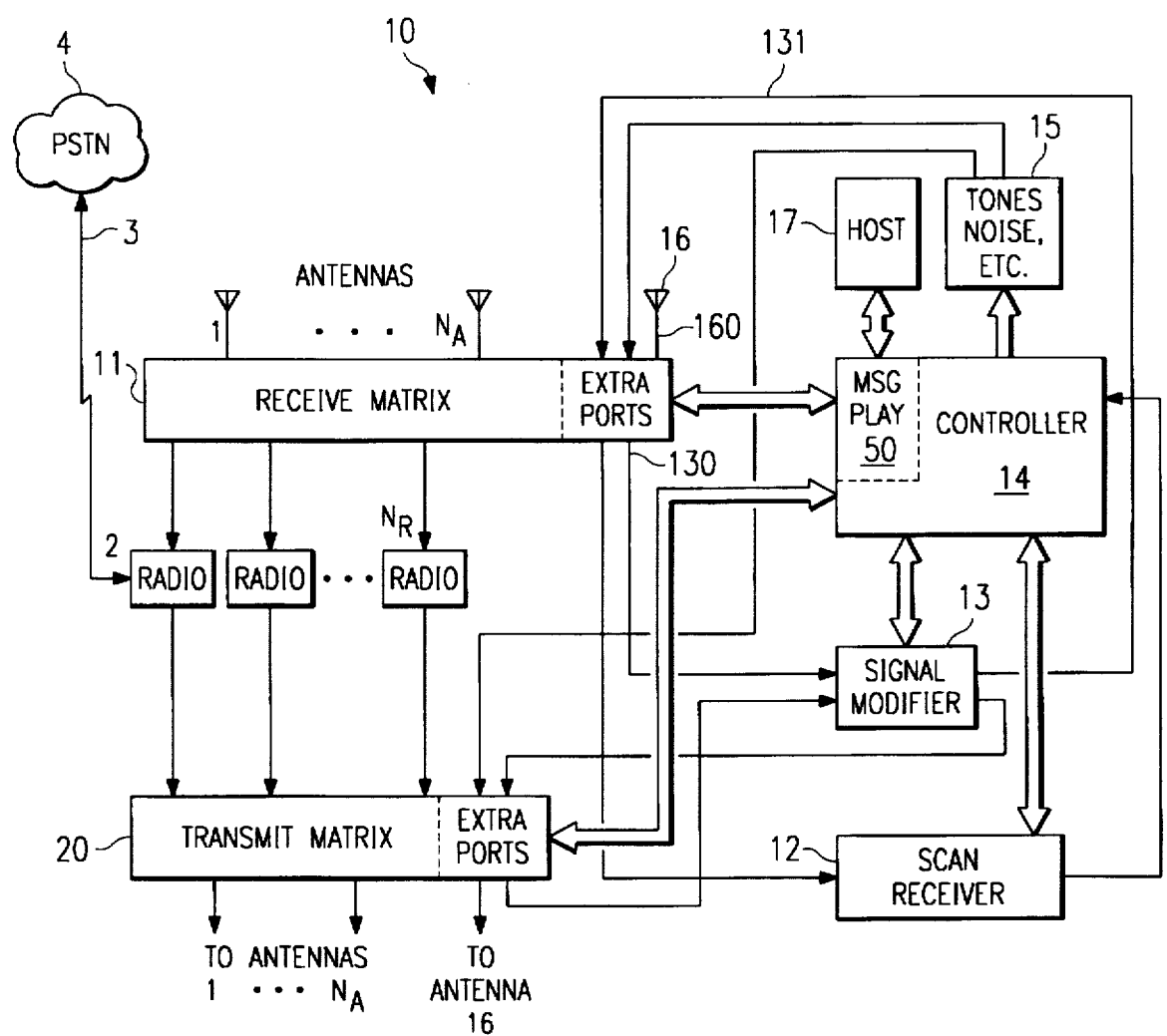

CELLULAR SYSTEM CONDITIONER WHICH OVERRIDES A DISCONNECT FOR ACTIVE RADIOS WIRELESSLY COMMUNICATING WITH MOBILES LOCATED IN PRE-IDENTIFIED TERRITORIAL POSITIONS

RELATED APPLICATIONS

Reference is hereby made to the following five co-pending and commonly assigned U.S. patent applications: APPARATUS, SYSTEMS AND METHODS FOR COMBINING IN WIRELESS COMMUNICATIONS SYSTEMS, Ser. No. 08/488,793; now U.S. pat. No. 5,563,610 MULTIPLE ANTENNA TRANSMISSION SYSTEM, Ser. No. 08/520,316; SYSTEM AND METHOD FOR FREQUENCY MULTIPLEXING ANTENNA SIGNALS, Ser. No. 08/520,000; and METHOD AND APPARATUS FOR IMPROVED CONTROL OVER CELLULAR SYSTEMS, Ser. No. 08/582,525; now U.S. 5648,968 SYSTEM AND METHOD FOR CELLULAR BEAM SPECTRUM MANAGEMENT, (47586-P005US-957058), the disclosures of which five applications are incorporated herein by reference.

TECHNICAL FIELD OF THE INVENTION

This invention relates to cellular telecommunications systems and more particularly to an improved signal conditioner system that enables selective adjustment of individual mobile radio characteristics in order to enhance control thereof within a cellular network.

BACKGROUND OF THE INVENTION

A primary objective in designing and implementing intelligent systems that control and manage cellular communications is to be able to modify radio characteristics of calls in progress so as to maintain, and advantageously improve, the continuing quality of a cellular call. As disclosed in above-referenced, co-pending, commonly assigned U.S. patent application Ser. No. U.S. 08/582,525 METHOD AND APPARATUS FOR IMPROVED CONTROL OVER CELLULAR SYSTEMS, such improved control and management may be enabled by use of a host controller governing the interactive operation of cells in a neighborhood. With reference to this disclosure, it will be appreciated that many of the call management techniques described therein require making modifications, often pretextually, to radio signal conditions of calls in progress. It will be understood that in response to actual or anticipated interference conditions, these pretextual modifications may advantageously trigger various compensating actions such as reverse link power boost, antenna beam change, channel change, handoff, etc.

A problem experienced in the operation of such control and management systems is, however, that the desired modifications often need to be made on a per channel basis. It is well understood that an antenna beam generally transmits or receives a wide spectrum of energy in which multiple calls may be embedded. Modifications to radio characteristics of the beam as a whole will therefore tend to affect all calls whose activity is embedded in the particular antenna beam signal. Further, adaptations of the antenna beam as a whole, and particularly amplification thereof, will tend to alter that beam's interference effect upon other neighboring beams, thereby affecting transmission/reception conditions for radios not even connected to the adapted antenna.

An additional problem exists where it is necessary to have an area in a cell served by a remote antenna, perhaps in a blind spot directly underneath the cellsite, or near a bridge or tunnel, or in a mall. In these situations case the coverage is very difficult to be obtained from conventionally placed co-located antennas, and often the remote antenna has to be physically located some distance away. Serving a cell with one or more such remote antennas can create a serious problem in cellsite control, in that radio channels must be dedicated to serve that particular area. The control channel nonetheless has to appear as though it is serving a sector in the coverage area. This therefore creates a confusing situation for the cellsite controller, which cannot tell whether the antenna it sees is a standard antenna located within the coverage area outdoors, or a remote antenna located within a building or another place where calls must be serviced differently.

Occasionally such remote antenna coverage is impractical or simply not provided in the cellular network. An example of this situation may be inside long tunnels. In such cases, blackout zones appear in the network. Even though the location of these blackout zones is known, and the passing therethrough by mobile signals can be identified and predicted, it is common for calls passing through blackout zones nonetheless to become disconnected. This is usually either because the passthrough time exceeds a predetermined silence time, typically about 5–10 seconds, after which the system automatically disconnects all calls, or because the land line party assumes a fault and hangs up.

There is, therefore, a need to be able to the modify radio characteristics, and pretextually when necessary, of a particular call signal being broadcast on an antenna on a particular channel, without affecting other call signals embedded in the same antenna signal, so as to enable improved control over call activity, advantageously on a neighborhood basis. There is also a need to be able, when required, to connect radio signals to remote antennas that are independent of and additional to the standard coverage areas, and to be able to manage calls connected thereto seamlessly with the rest of the cellsite, including accounting for the particular needs of such non-standard coverage. Such needs may also include preventing an automatic disconnect when a mobile is in a known blackout zone, and alerting the land line party to stand by and not hang up while the mobile party is passing through such a blackout zone.

SUMMARY OF THE INVENTION

Among the primary features of the present invention are an oversized receive matrix switch and an oversized transmit matrix switch located at a cellsite, each matrix switch with additional input and output ports than would normally be required to serve the cellsite. The receive matrix switch and the control matrix switch are advantageously separate, and in normal operation work in combination with devices, control mechanisms and intelligence that address the above-described problems.

It will be understood that radios in operation in the cellsite may be connected through the matrix switches to antennas covering the cell. This feature reflects cellular switching standard in the art. The extra ports, however, may be used to connect the radios to remote antennas or to connect a scanning device to various radios and antennas to monitor their status and then report same to the controller. The extra ports may further be used to route radio signals through signal modifying devices such as amplifiers, attenuators or filters. The extra ports may yet further be used to inject additional pretextual signals such as noise or tones to generate desired call management effects.

The collective operation of the present invention is controlled by an air interface controller (hereafter also referred to as the "controller"), advantageously also in control communication with a host controller that oversees call management in a neighborhood of cells. This controller/host combination provides intelligence to the operation of the matrix switches as described below in more detail. The controller also advantageously includes a message player, whose prerecorded messages may be overlaid on radio signals. The controller may play these messages through the receive matrix switch and then patch them through to a land line party that may be connected to a mobile passing through a known blackout zone such as a tunnel.

It will thus be appreciated that a technical advantage of the present invention is that the controller may connect a radio in operation on a particular channel to the antenna port for which the highest RSSI is detected, including a remote antenna on an extra port, regardless of the location of the antenna.

A further technical advantage of the present invention is that the scanning device may scan call activity through the switch and report back on the status thereof to the controller, advantageously without interrupting or affecting voice communications in the call in progress. The controller may then use this information to make decisions and take action that will enhance the continuing quality of collective calls.

A still further technical advantage of the present invention is that in making decisions and taking action, the controller may use the signal modifying devices and signal generating devices connected to the extra ports to modify pre-identified radio signals, or to inject an extra signal into one or more of the inputs or outputs of the switch. In this way, received and/or transmitted signals may be modified, pretextually when necessary, or signal/interference conditions may be artificially created so as to optimize call flow management. It will be further appreciated that the present invention thus enables the controller to manage signals on a per channel call-by-call basis.

A yet further advantage of the present invention is that intelligence in the controller and/or host may identify when a mobile is about to enter a blackout zone or encounter other significant interference. The controller may then send a message to the radio site controller to override any automatic disconnect, and may also play a prerecorded message alerting the land line party to stand by and not hang up.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, FIG. 1 shows a high level block diagram illustrating the topology and architecture of the present invention.

DESCRIPTION OF THE PREFERRED EMBODIMENTS

With reference to the accompanying drawing, which is a block diagram illustrating the present invention, system 10 is in a cell governed by air interface controller 14 (hereafter also referred to as "controller"). Antennas 1 through $N_A$ are situated throughout the cell in a traditional co-location deployment, and are connected to receive matrix 11, a switch, whose operation is controlled by controller 14. It will be understood, particularly with reference to the above cited, co-pending, commonly assigned U.S. patent applications APPARATUS, SYSTEMS AND METHODS FOR ANTENNA COMBINING IN WIRELESS COMMUNICATIONS SYSTEMS and MULTIPLE ANTENNA TRANSMISSION SYSTEM, that antennas 1 through $N_A$ may be single beam antennas, traditional three-face antennas, or narrow beam antennas similar to those disclosed in the cited co-pending applications.

Receive matrix 11 serves as a switch to connect various of antennas 1 through $N_A$ to the receive sides of radios 2 through NR according to the instructions of controller 14. Radios 2 through NR are connected via one or more land lines 3 to the Public Switched Telephone Network (PSTN) 4. In this way, it will be understood that signals incoming from mobiles served by system 10 will be received on ones of antennas 1 through $N_A$, switched through receive matrix 11 to ones of radios 2 through $N_R$, and then routed along land lines 3 to their destinations on PSTN 4.

Receive matrix 11 also has extra ports. One or more additional antennas 16 are connected to one of these extra ports and may typically be interior to a building or at some other non-standard location such as described above. Additional antenna 16 is connected to an extra port of receive matrix 11 by line 160, which may advantageously be a coaxial cable, or a fiber optic line, or even a microwave link. Additional antenna 16 may advantageously be omni-directional antenna comprising a leaky coaxial cable, or it may be a repeater.

Receive matrix 11 also has scan receiver 12 connected to one of the extra ports. The operation of scan receiver 12, scanning signal conditions between radios and antennas connected within receive matrix 11, is controlled by controller 14. Typically, controller 14 may use a simple algorithm to tell scan receiver 12 to tune to a specific channel and scan for signal conditions on that channel for each antenna connected to receive matrix 11, whether a radio is connected to that antenna or not. Scan receiver 12 then reports data back to controller 14 before moving on to the next channel scan.

Let it be assumed that the current status of system 10 is that mobiles have activated radios 2 through $N_R$ and calls are currently in progress using those radios. Controller 14 is assigning radios 2 through $N_R$ beams on various of antennas 1 through $N_A$, or possibly additional antenna 16, according to information received by scan receiver 12. A radio site controller, not shown, assigns and manages channels on which radios 2 through NR are operating.

Then, as the mobiles actually move, it is often necessary that radios 2 through $N_R$ periodically be assigned to different antennas according to reception conditions. Controller 14 continuously instructs scan receiver 12 to look through all of the available antenna ports and report reception information. Controller 14 then instructs receive matrix 11 to connect the radio to one or more ports, and advantageously two ports, whose antennas are likely to give the best conditions. It will be appreciated by those in the art that typically diversity is used in the radio receiver and so the two "best" antennas will be connected thereto.

It will be appreciated that a situation may occur where controller 14 may foresee a potential interference situation for a given radio. For example, controller 14 may be equipped with features such as disclosed in above-referenced co-pending commonly assigned U.S. patent application METHOD AND APPARATUS FOR IMPROVED CONTROL OVER CELLULAR SYSTEMS, in which such potential interference situations may be foreseen by comparing cell neighborhood data, advantageously in combination with historical and/or topographical information regarding the cell network itself.

According to the present invention, therefore, having identified a potential interference situation, controller 14 has options on taking compensating action. A first option employs signal modifier 13, which may include one or more of a number of devices, such as a filter, an amplifier, or an attenuator, or combinations thereof. Signal modifier 13 is also connected to the extra port capability of receive matrix 11 through input line 130 and output line 131, and is controlled by controller 14. Controller 14 routes the received signal through to signal modifier 13 for the radio for which interference is anticipated. According to disposition instructions from controller 14, signal modifier 13 then modifies the received signal so as to compensate for the anticipated interference condition. In this regard, signal modifier 13 might also include an interference canceler device that may be routed as required to signals experiencing interference.

A second option afforded by the present invention to controller 14 to compensate for an anticipated interference condition is by employing generator 15. Feeding into an extra port in receive matrix 11 through line 141, the operation of generator 15 is again controlled by controller 14. It will be understood, however, that there is no feed into generator 15 from receive matrix 11.

According to instructions from controller 14, generator 15 may generate one or more alternative outputs such as noise or tones, or combinations thereof, to affect the assignment of radios to antennas. Say, for example, it is anticipated that the behavior of a mobile in a nearby cell will cause a particular radio to encounter an interference problem on making its next logical antenna or channel assignment change. Controller 14 may instruct generator 15 to generate artificial baseband noise below voice level and then route that noise to the port in receive matrix 11 to which that radio would logically be connected next. That noise signal would cause the radio site controller to believe that there is an imminent actual interference event and not connect to that antenna on that channel, thus avoiding the anticipated interference problem. Instead, the radio site controller most likely would try to change channels or hand off to another cell. It will be understood that actions by generator 15 in this regard advantageously take place without interrupting or affecting voice communications in the signal acted upon.

Again with reference to co-pending commonly assigned U.S. patent application METHOD AND APPARATUS FOR IMPROVED CONTROL OVER CELLULAR SYSTEMS, it will be understood that the present invention may also facilitate improved neighborhood cellular communication through intercommunication with host 17. In accordance with the disclosure of said co-pending application, host 17 may be coordinating cellular call activity in several cells, advantageously on a neighborhood basis.

In such a deployment, it will be thus appreciated that controller 14 may also take action in accordance with the present invention according to instructions from host 17, based on call activity in nearby cells. For example, scan receiver 12 may be scanning antenna conditions on ports within receive matrix 11 on a channel that, according to predefined re-use patterns, is not normally used in its own cellsite. Suppose scan receiver 12 detects the presence of a mobile radio using that channel that is about to enter the cellsite or about to depart another cellsite. That information is relayed back to controller 14. Although controller 14 itself has no interest in this data, it will pass it on to host 17 to enable higher level control over a cell neighborhood. Host 17 may then, for example, use the information to direct the operation of other interested controllers in neighboring cellsites to which host 17 is also connected. Alternatively, host 17 may combine this information with other data received from other controllers and then send back instructions to controller 14 to take action in accordance with an overall neighborhood condition.

It will be further appreciated that in scanning for reception conditions, scan receiver 12 may not only monitor for received signal strength, but also for a supervisory audio tone, or "SAT" tone. In AMPS radio there are three SAT tones and in NAMPS radio there are seven. Each wireless communication typically carries one of the SAT tones, and cellular control systems may use the SAT tone accompanying a particular communication to further uniquely identify the communication to a particular radio.

In this way, information regarding the SAT tones detected by scan receiver 12 may be fed back to controller 14 to further substantially reduce the chance that controller 14, and ultimately host 17, will not misidentify the calls in progress and connect a mobile to the wrong radio.

In one embodiment herein, scan receiver 12 may be an extremely narrow band scan receiver such as one which uses a DSP filter. In such an application of the present invention, scan receiver 12 could advantageously differentiate among received channels less than 100 Hz wide. Such resolution would enable detection by scan receiver 12 of a potential co-channel interferer with the same SAT, which might be utilizing the same channel but on a slightly different carrier frequency.

It will be thus understood that once scan detector 12 has made this detection and has then fed this information to controller 14, host 17, through controller 14, may be made immediately aware of C/I, the carrier to interference ratio for the call.

Again with further reference to co-pending commonly assigned U.S. patent application METHOD AND APPARATUS FOR IMPROVED CONTROL OVER CELLULAR SYSTEMS, it will be understood that C/I measurements regarding calls in progress may be advantageously analyzed in combination by host 17 and/or controller 14 to facilitate improved control over call activity in a neighborhood. As disclosed in METHOD AND SYSTEM FOR IMPROVED CONTROL OVER CELLULAR SYSTEMS, when there are no calls in progress detected by scan receiver 12 on a particular channel at a particular time, interference measurements from one or more ports may be combined by host 17 and/or controller 14 to compile an interference map of the neighborhood for use by neighboring cellsites in controlling call activity. As each subsequent radio is keyed onto the air, the new signal, as it appears to scan receiver 12 on all ports within receive matrix 11, then gives host 17 and/or controller 14 an instant measurement of C/I for that call.

The foregoing has so far discussed control over antenna assignment with regard to reception of signals by radios 2 through $N_R$. On transmission, analogous but not identical logic applies.

Transmit matrix 20 is a switch also controlled by controller 14 and has ports to which transmit signals from each of radios 2 through $N_R$ may be connected. Analogous to receive matrix 11, transmit matrix 20 has extra ports, one of which may also be connected to additional antenna 16, and others of which may be connected to signal modifier 13 and generator 15. Also analogous to receive matrix 11, controller 14 instructs transmit matrix 20 to connect the transmit signals of ones of radios 2 through $N_R$ to antennas according to intelligence in controller 14 and/or host 17.

In a normal situation, reciprocity might imply that the transmit port on transmit matrix 20 and the receive port on receive matrix 11 be connected to the same antenna. However, since interference is not always reciprocal, and may often exhibit local variations, and there may very well be a better choice of transmit output than received input. This determination is advantageously made at host 17 which, as described above, may interpret data from several neighboring cellsites. For example, host 17 might detect a potential interference condition in another cellsite if a particular radio was to transmit in this cellsite on a particular antenna. Host 17 then informs controller 14 of the potential interference problem and that controller 14 should avoid connecting the transmit signal of that radio to that antenna if possible. Controller 14 may then determine whether local transmission would be sufficiently strong on another available antenna, and if so, directs transmit matrix 20 to make connections accordingly.

Alternatively, if no suitable standard pattern antennas are available, then controller 14 may instruct transmit matrix to connect the radio in question to a remote antenna such as additional antenna 16.

For coverage of blackout zones, controller 14 also includes message player 50. Message player 50 is disposed to play prerecorded messages which controller 14 may overlay on radio signals at receive matrix 11. Controller 14 is also disposed, advantageously upon receipt of a special signal from generator 15 to override any automatic disconnect implemented by the radio site controller after a predetermined time (typically 10 seconds) of radio silence.

In this way, intelligence in host 17 and/or controller 14 will identify a mobile under system 10's control that is about to enter a blackout zone. This identification is advantageously enabled by cross-referencing triangulation data disclosing the location of the mobile with known topographical data regarding the network, such as is taught in above-referenced, co-pending, commonly assigned U.S. application METHOD AND APPARATUS FOR IMPROVED CONTROL OVER CELLULAR SYSTEMS. The mobile having gone into blackout, message player 50 in controller 14 plays a prerecorded message advising the land line party that the mobile party is temporarily out of radio reception but will shortly return, and that the land line party should stand by and not hang up. Controller 14 patches this message through to the land line party by overlaying the message at the in receive matrix 11 to which the land line party's radio is connected.

Further, while the message is being played and advantageously periodically repeated, controller 14 also alerts the radio site controller not to execute an automatic disconnect pending the return to cellular coverage of the mobile party. Alternatively, where holding the call is not feasible, the land line may be held and a quick reconnect advantageously established once the radio emerges from the blackout.

Notwithstanding the foregoing disclosure to a separate receive matrix switch 11 and transmit matrix switch 20, it will be understood by those in this art that the matrix switching of the present invention need not be limited to this configuration, and that equivalent matrix switching, standard in the art, may also enable an embodiment including a single, larger switch, or a matrix switch array of several interconnecting switches.

It will be further understood by those in this art that the logic and intelligence of the present invention may also be embodied on software, executable on a general purpose computer having a processor, a memory, a data storage capacity, and advantageously a display device.

Although the present invention and its advantages have been described in detail, it should be understood that various changes, substitutions and alterations can be made herein without departing from the spirit and scope of the invention as defined by the appended claims.

I claim:

1. A radio signal conditioning system, comprising:
   at least one matrix switch;
   a plurality of antennas, the antennas in information communication with each matrix switch;
   at least one active radio, the at least one active radio also in information communication with each matrix switch;
   each active radio is also in information communication with a remote party through a land line.
   a scan receiver, the scan receiver also in information communication with each switch matrix, the scan receiver monitoring prevailing radio conditions at ones of the antennas and ones of the radios;
   a controller, the controller in information communication with each matrix switch and with the scan receiver, the controller receiving information regarding prevailing radio signal conditions from one or more information sources, said information sources including the scan receiver, the controller instructing each matrix switch to connect the at least one active radio to ones of the antennas according to said received radio condition signal information;
   a disconnect means, said disconnect means disposed to automatically disconnect ones of said remote parties from active radios that, for a predetermined period of time, receive radio signals below a predetermined power level; and
   the controller is disposed to override ones of said disconnects for active radios wirelessly communicating with mobiles located in pre-identified territorial positions.

2. The radio signal conditioner of claim 1, in which said information sources also include one or more of the matrix switches.

3. The radio signal conditioner of claim 1, in which said information sources also include a separate host.

4. The radio signal conditioner of claim 1, in which the plurality of antennas include one or more standard antennas and one or more remote antennas, said standard antennas offering radio signal coverage according to a predetermined pattern, said remote antennas offering radio signal coverage supplemental to said predetermined pattern.

5. The radio signal conditioner of claim 1, in which the at least one radio transmits and receives radio signals, and further comprising:
   signal conditioning means, the signal conditioning means in information communication with each matrix switch and with the controller, the signal conditioning means modifying ones of the radio signals according to modifying instructions from the controller, the controller generating said modifying instructions according to said received radio condition information.

6. The radio signal conditioner of claim 5, in which the signal conditioning means includes one or more signal conditioning devices selected from the group consisting of an amplifier, a filter, an attenuator and an interference canceler.

7. The radio signal conditioner of claim 1, in which the at least one radio transmits and receives radio signals, and further comprising:

signal generating means, the signal generating means in information communication with each matrix switch and with the controller, the signal generating means injecting predetermined generated signals into ones of the matrix switches according to generating instructions from the controller, the controller creating said generating instructions according to said received radio condition information.

8. The radio signal conditioner of claim 7, in which the signal generating means generates signals of one or more types, said signal types selected from the group consisting of tones and noise.

9. The radio signal conditioner of claim 1, in which each active radio is also in information communication with a remote party through a land line, and further comprising:

a message player, the message player playing one or more prerecorded messages to ones of the remote parties at the instruction of the controller.

10. The radio signal conditioner of claim 9, in which said messages are played to remote parties in information communication with active radios whose Received Signal Strength Index (RSSI) falls below a predetermined power level.

11. The radio signal conditioner of claim 9, in which said messages are played to remote parties in information communication with active radios wirelessly communicating with mobiles located in pre-identified territorial positions.

12. The radio signal conditioner of claim 1, in which the predetermined period of time is approximately 10 seconds.

13. The radio signal conditioner of claim 1, in which each active radio is also in information communication with a remote party through a land line, and further comprising:

disconnect means, said disconnect means disposed to automatically disconnect ones of said remote parties from active radios that, for a predetermined period of time, receive radio signals below a predetermined power level; and reconnect means, the controller disposed to hold the land line following operation of said disconnect means, said reconnect means, responsive to the controller, disposed to reestablishing information communication between active radios and remote parties previously disconnected.

14. The radio signal conditioner of claim 1, in which the at least one matrix switch includes a receive matrix and a transmit matrix, the receive matrix in information communication with the receive side of each active radio, the transmit matrix in information communication with the transmit side of each active radio.

15. A method of conditioning radio signals, comprising the steps of:

receiving radio signals on each of a plurality of antennas, each of said radio signals displaying one or more transmission characteristics;

connecting each of said antennas to a separate port on a matrix switch array, said array comprising one or more interconnected matrix switches;

connecting each of the receive sides of one or more radios to further separate ports on the matrix switch array;

connecting each of the transmit sides of said one or more radios to yet further separate ports on the matrix switch array;

processing system transmission information, said system transmission information including local transmission information obtained by monitoring ones of the transmission characteristics of said radio signals;

through the matrix switch array, patching preselected ones of the antennas to ones of the radios, said antenna preselections based on said processed system transmission information;

following said patching step, each of said patched radios is in information communication with a land line party;

for patched radios whose Received Signal Strength Index (RSSI) falls below a preselected power level for a predetermined period of time, disconnecting land line parties from further information communication therewith; and overriding said disconnecting step when mobiles wirelessly communicating with ones of said patched radios are located at pre-identified territorial positions.

16. The method of claim 15, in which said system transmission information further includes non-local transmission information, said non-local transmission information including transmission characteristics of radio signals received on other antennas not included in said plurality thereof.

17. The method of claim 15, in which said patching step includes the substep of allowing the receive side and the transmit side of one or more radios to be connected to different antennas.

18. The method of claim 15, further comprising the step of:

adapting ones of said radio signals in response to said processed system transmission information.

19. The method of claim 18, in which said adapting step includes one or more substeps selected from the group consisting of:

(a) injecting noise into ones of said radio signals;

(b) injecting one or more tones into ones of said radio signals;

(c) amplifying ones of said radio signals;

(d) filtering ones of said signals;

(e) attenuating ones of said signals; and (f) canceling interference on ones of said signals.

20. The method of claim 15, in which said plurality of antennas includes one or more standard antennas and one or more remote antennas, said standard antennas offering radio signal coverage according to a predetermined pattern, said remote antennas offering radio signal coverage supplemental to said predetermined pattern.

21. The method of claim 15, in which, following said patching step, each of said patched radios is in information communication with a land line party, and further comprising the step of:

playing messages to ones of the land line parties in response to one or more predetermined events.

22. The method of claim 21, in which a message is played when the Received Signal Strength Index (RSSI) on patched radios falls below a preselected power level.

23. The method of claim 22, in which a message is played when mobiles wirelessly communicating with ones of said patched radios are located at pre-identified territorial positions.

24. The method of claim 15, in which the predetermined period of time is approximately 10 seconds.

25. The method of claim 15, in which, following said patching step, each of said patched radios is in information communication with a land line party, and further comprising the steps of:

for patched radios whose Received Signal Strength Index (RSSI) falls below a preselected power level for a predetermined period of time, disconnecting land line parties from further information communication therewith;

maintaining information links with said disconnected land line parties; and subsequently reestablishing information communication between patched radios and said disconnected land line parties.

26. A method of conditioning radio signals, comprising the steps of:

receiving radio signals on each of a plurality of antennas, each of said radio signals displaying one or more transmission characteristics, said plurality of antennas including one or more standard antennas and one or more remote antennas, said standard antennas offering radio signal coverage according to a predetermined pattern, said remote antennas offering radio signal coverage supplemental to said predetermined pattern;

connecting each of said antennas to a separate port on a matrix switch array, said array comprising one or more interconnected matrix switches;

connecting each of the receive sides of one or more radios to further separate ports on the matrix switch array;

connecting each of the transmit sides of said one or more radios to yet further separate ports on the matrix switch array;

processing system transmission information, said system transmission information including local transmission information obtained by monitoring ones of the transmission characteristics of said radio signals, said system transmission information further including non-local transmission information, said non-local transmission information including transmission characteristics of radio signals received on other antennas not included in said plurality thereof;

adapting ones of said radio signals in response to said processed system transmission information, wherein said adapting step includes one or more substeps selected from the group consisting of:

(a) injecting noise into ones of said radio signals;

(b) injecting one or more tones into ones of said radio signals;

(c) amplifying ones of said radio signals;

(d) filtering ones of said signals;

(e) attenuating ones of said signals; and (f) canceling interference on ones of said signals;

through the matrix switch array, patching preselected ones of the antennas to ones of the radios, said antenna preselections based on said processed system transmission information, said patching step including the substep of allowing the receive side and the transmit side of one or more radios to be connected to different antennas, said patching step further enabling information communication between each of said patched radios and a land line party;

playing messages to ones of the land line parties in response to one or more predetermined events, said predetermined events including when the Received Signal Strength Index (RSSI) on patched radios falls below a preselected power level and when mobiles wirelessly communicating with ones of said patched radios are located at pre-identified territorial positions;

for patched radios whose Received Signal Strength Index (RSSI) falls below a preselected power level for a predetermined period of time, disconnecting land line parties from further information communication therewith;

maintaining information links with said disconnected land line parties;

subsequently reestablishing information communication between patched radios and said disconnected land line parties; and overriding said disconnecting step when mobiles wirelessly communicating with ones of said patched radios are located at pre-identified territorial positions.

27. A system for conditioning radio signals, comprising:

means for receiving radio signals on each of a plurality of antennas, each of said radio signals displaying one or more transmission characteristics;

means for connecting each of said antennas to a separate port on a matrix switch array, said array comprising one or more interconnected matrix switches;

means for connecting each of the receive sides of one or more radios to further separate ports on the matrix switch array;

means for connecting each of the transmit sides of said one or more radios to yet further separate ports on the matrix switch array;

means for processing system transmission information, said system transmission information including local transmission information obtained by monitoring ones of the transmission characteristics of said radio signals;

means for patching preselected ones of the antennas through the matrix switch array to ones of the radios, said antenna preselections based on said processed system transmission information;

said means for patching places each of said patched radios in information communication with a land line party;

means for disconnecting land line parties from further information communication with patched radios whose Received Signal Strength Index (RSSI) falls below a preselected power level for a predetermined period of time; and means for overriding said means for disconnecting when mobiles wirelessly communicating with ones of said patched radios are located at pre-identified territorial positions.

28. The system of claim 27, in which said system transmission information further includes non-local transmission information, said non-local transmission information including transmission characteristics of radio signals received on other antennas not included in said plurality thereof.

29. The system of claim 27, in which the means for patching includes means for allowing the receive side and the transmit side of one or more radios to be connected to different antennas.

30. The system of claim 27, in which said means for patching includes:

means, responsive to said processed system transmission information, for adapting ones of said radio signals.

31. The system of claim 30, in which said means for adapting includes one or more signal conditioning means selected from the group consisting of:

(a) means for injecting noise into ones of said radio signals;

(b) means for injecting one or more tones into ones of said radio signals;

(c) means for amplifying ones of said radio signals;

(d) means for filtering ones of said signals;

(e) means for attenuating ones of said signals; and (f) means for canceling interference on ones of said signals.

32. The system of claim 27, in which said plurality of antennas includes one or more standard antennas and one or more remote antennas, said standard antennas offering radio signal coverage according to a predetermined pattern, said remote antennas offering radio signal coverage supplemental to said predetermined pattern.

33. The system of claim 27, in which said means for patching places each of said patched radios in information communication with a land line party, and further comprising:

means for playing messages to ones of the land line parties in response to one or more predetermined events.

34. The system of claim 33, in which a message is played when the Received Signal Strength Index (RSSI) on patched radios falls below a preselected power level.

35. The system of claim 34, in which a message is played when mobiles wirelessly communicating with ones of said patched radios are located at pre-identified territorial positions.

36. The system of claim 27, in which the predetermined period of time is approximately 10 seconds.

37. The system of claim 27, in which said means for patching places each of said patched radios in information communication with a land line party, and further comprising:

means for disconnecting land line parties from further information communication with patched radios whose Received Signal Strength Index (RSSI) falls below a preselected power level for a predetermined period of time;

means for maintaining information links with said disconnected land line parties; and means for subsequently reestablishing information communication between patched radios and said disconnected land line parties.

38. A computer program product having a computer readable medium on which computer readable logic is recorded for conditioning radio signals in a telecommunications network, the computer program product in a telecommunications system including a processor and a memory and a display device, the computer program product comprising:

means for processing radio signals received on each of a plurality of antennas, each of said radio signals displaying one or more transmission characteristics;

means for connecting each of said antennas to a separate port on a matrix switch array, said array comprising one or more interconnected matrix switches;

means for connecting each of the receive sides of one or more radios to further separate ports on the matrix switch array;

means for connecting each of the transmit sides of said one or more radios to yet further separate ports on the matrix switch array;

means for processing system transmission information, said system transmission information including local transmission information obtained by monitoring ones of the transmission characteristics of said radio signals;

means for patching preselected ones of the antennas through the matrix switch array to ones of the radios, said antenna preselections based on said processed system transmission information;

said means for patching places each of said patched radios in information communication with a land line party;

means for disconnecting land line parties from further information communication with patched radios whose Received Signal Strength Index (RSSI) falls below a preselected power level for a predetermined period of time; and means for overriding said means for disconnecting when mobiles wirelessly communicating with ones of said patched radios are located at pre-identified territorial positions.

39. The computer program product of claim 38, in which said system transmission information further includes non-local transmission information, said non-local transmission information including transmission characteristics of radio signals received on other antennas not included in said plurality thereof;

said means for patching places each of said patched radios in information communication with a land line party;

means for disconnecting land line parties from further information communication with patched radios whose Received Signal Strength Index (RSSI) falls below a preselected power level for a predetermined period of time; and means for overriding said means for disconnecting when mobiles wirelessly communicating with ones of said patched radios are located at pre-identified territorial positions.

40. The computer program product of claim 38, in which the means for patching includes means for allowing the receive side and the transmit side of one or more radios to be connected to different antennas.

41. The computer program product of claim 38, in which said means for patching includes:

means, responsive to said processed system transmission information, for adapting ones of said radio signals.

42. The computer program product of claim 41, in which said means for adapting includes one or more signal conditioning means selected from the group consisting of:

(a) means for injecting noise into ones of said radio signals;

(b) means for injecting one or more tones into ones of said radio signals;

(c) means for amplifying ones of said radio signals;

(d) means for filtering ones of said signals;

(e) means for attenuating ones of said signals; and (f) means for canceling interference on ones of said signals.

43. The computer program product of claim 38, in which said plurality of antennas includes one or more standard antennas and one or more remote antennas, said standard antennas offering radio signal coverage according to a predetermined pattern, said remote antennas offering radio signal coverage supplemental to said predetermined pattern.

44. The computer program product of claim 38, in which said means for patching places each of said patched radios in information communication with a land line party, and further comprising:

means for playing messages to ones of the land line parties in response to one or more predetermined events.

45. The computer program product of claim 44, in which a message is played when the Received Signal Strength Index (RSSI) on patched radios falls below a preselected power level.

46. The computer program product of claim 45, in which a message is played when mobiles wirelessly communicating with ones of said patched radios are located at pre-identified territorial positions.

47. The computer program product of claim 38, in which the predetermined period of time is approximately 10 seconds.

48. The computer program product of claim 38, in which said means for patching places each of said patched radios in information communication with a land line party, and further comprising:

means for disconnecting land line parties from further information communication with patched radios whose Received Signal Strength Index (RSSI) falls below a preselected power level for a predetermined period of time;

means for maintaining information links with said disconnected land line parties; and means for subsequently reestablishing information communication between patched radios and said disconnected land line parties.

* * * * *